United States Patent
Marking

(10) Patent No.: US 7,232,531 B2
(45) Date of Patent: Jun. 19, 2007

(54) METHOD OF REMOVING IMPURITIES FROM A SRB$_4$O$_7$:EU PHOSPHOR

(75) Inventor: Gregory A. Marking, Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 343 days.

(21) Appl. No.: 10/907,040

(22) Filed: Mar. 17, 2005

(65) Prior Publication Data

US 2006/0208224 A1 Sep. 21, 2006

(51) Int. Cl.
C09K 11/63 (2006.01)

(52) U.S. Cl. .............................. 252/301.4 R

(58) Field of Classification Search .......... 252/301.4 R
See application file for complete search history.

(56) References Cited

U.S. PATENT DOCUMENTS

| 4,719,033 A | 1/1988 | Chenot et al. ........... 252/301.4 |
| 5,068,055 A | 11/1991 | Chenot et al. ........... 252/301.4 |
| 5,378,398 A | 1/1995 | Kasenga et al. ...... 252/301.4 R |

*Primary Examiner*—C. Melissa Koslow
(74) *Attorney, Agent, or Firm*—Robert F. Clark

(57) ABSTRACT

An acidic solution can be used to dissolve undesirable impurity phases in UV-emitting SrB$_4$O$_7$:Eu phosphors that reduce the UV emission intensity of said phosphor. In particular, the impurity phase, SrB$_6$O$_{10}$:Eu, is no longer detected after treating the phosphor with an acid washing process. The phosphors after acid washing are shown to have improved UV emission intensity without greatly increasing the mean particle size.

8 Claims, 1 Drawing Sheet

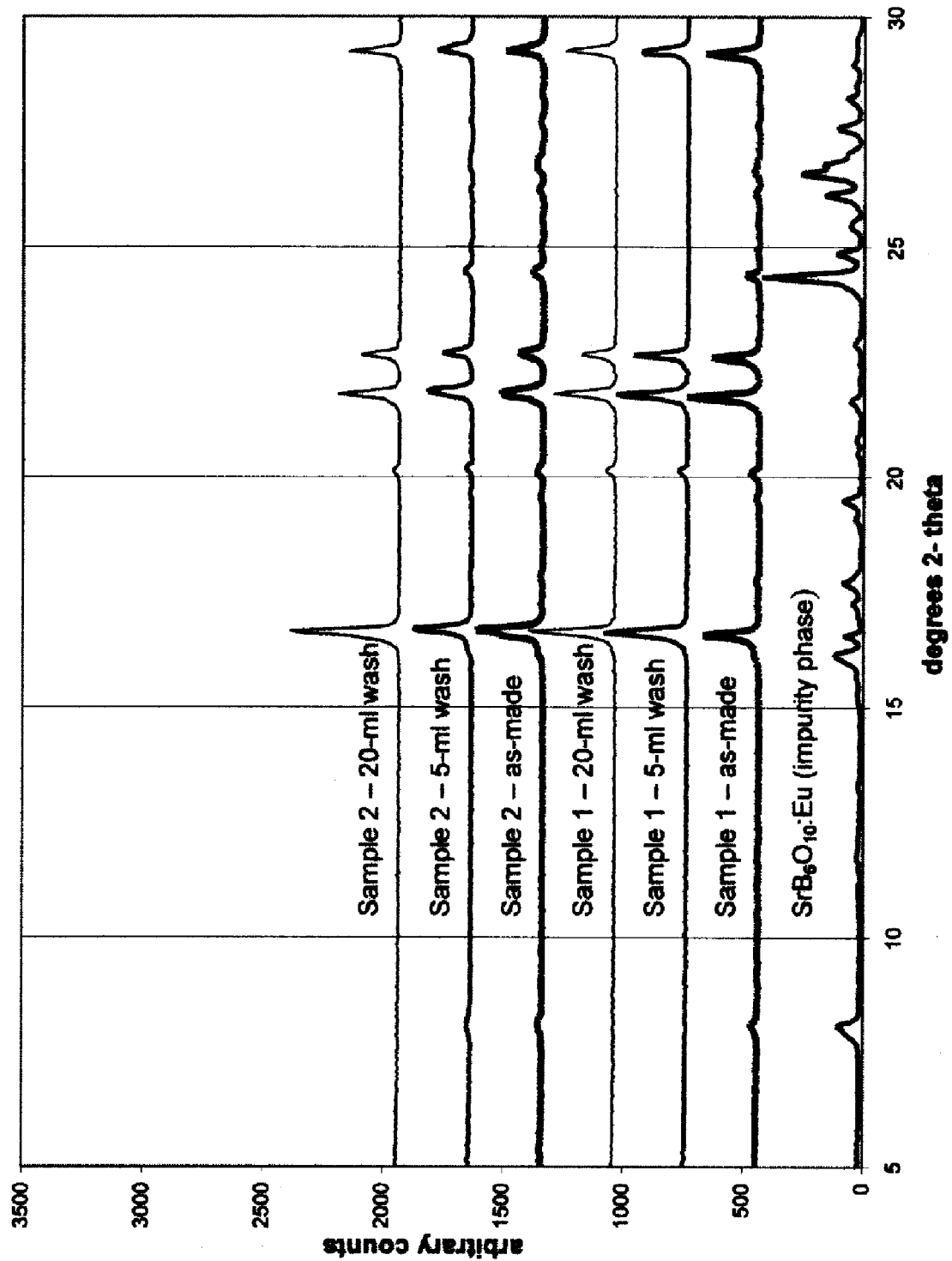

METHOD OF REMOVING IMPURITIES FROM A SRB$_4$O$_7$:EU PHOSPHOR

TECHNICAL FIELD

This invention relates to methods of making ultraviolet-emitting phosphors and improving the brightness thereof. More particularly, this invention relates to a method of removing impurity phases from SrB$_4$O$_7$:Eu phosphors.

BACKGROUND OF THE INVENTION

The manufacture of UV-emitting SrB$_4$O$_7$:Eu phosphors is a complicated process. Solid-state reaction is difficult due to the large amount of boron-containing reagents required to produce the correct stoichiometry. Boric acid and/or boron oxide reactants will melt at relatively low temperatures, leading to phase segregation and hindering the further reaction needed to produce the phosphor at higher temperatures. Upon cooling the reaction, hard glassy materials are commonly formed. Traditional solid-state syntheses of this phosphor requires repeated cycles of heating and grinding to prepare the phosphor.

A chemical precipitation method is described U.S. Pat. Nos. 4,719,033 and 5,068,055 to circumvent these repeated cycles of heating and grinding, but this method also has its own unique problems. In particular, the method involves adding a SrCO$_3$—Eu$_2$O$_3$ mixture to a concentrated boric acid solution at ~95° C., whereby an exchange reaction takes place forming (Sr,Eu)B$_6$O$_{10}$.5H$_2$O and CO$_2$ gas. A carefully controlled excess of the SrCO$_3$—Eu$_2$O$_3$ mixture is added to result in an intimate mixture of (Sr,Eu)B$_6$O$_{10}$.5H$_2$O and SrCO$_3$—Eu$_2$O$_3$ which is then dried and granulated before being fired in a reducing atmosphere to produce the final SrB$_4$O$_7$:Eu phosphor. However, if the mixture is not intimate enough before firing, the formation of SrB$_6$O$_{10}$:Eu can occur. SrB$_6$O$_{10}$:Eu is known to be a very poor UV-emitting phosphor and the presence of this phase drastically reduces the UV emission intensity of the phosphor.

This problem of SrB$_4$O$_7$:Eu phosphor containing the impurity phase SrB$_6$O$_{10}$:Eu has been encountered in the past and solutions to improve the UV emission intensity of such material have been proposed. U.S. Pat. No. 5,378,398 teaches that mixing SrCO$_3$ or SrF$_2$ or NH$_4$F with such a phosphor material, and then firing said mixture in a reducing atmosphere converts the SrB$_6$O$_{10}$:Eu phase to SrB$_4$O$_7$:Eu and improves the emission characteristics. In practice, the emission characteristics are dramatically improved, but this treatment results in very sintered, hard cakes of phosphor that are difficult to finish. Even after milling, the particle size of the phosphor can be unacceptably large.

SUMMARY OF THE INVENTION

This invention uses an acidic solution to dissolve the SrB$_6$O$_{10}$:Eu and other impurity phases that reduce the UV emission intensity of SrB$_4$O$_7$:Eu phosphors. After the acid washing treatment, the phosphor has improved UV emission intensity. The average particle size of the phosphor is only slightly or moderately increased due mainly to removal of fine particles.

In the method of this invention, the pH of the acidic solution is adjusted to a level that will not dissolve the majority of the SrB$_4$O$_7$:Eu phosphor phase. Nitric acid (HNO$_3$) is preferred, however, other strong acids may also be diluted to the appropriate pH and used for the same effect. The acid-treated material does not need be refired to obtain the improved UV emission results and therefore unacceptable particle size growth does not result. Further still, the amount of acid required for this method may be adjusted relative to the amount of SrB$_6$O$_{10}$:Eu impurity present in the material. Lower amounts of impurity phase will require lower amounts of acid, and vice versa.

BRIEF DESCRIPTION OF THE DRAWING

The FIGURE is a graphical illustration of several x-ray diffraction patterns that demonstrate the removal of the SrB$_6$O$_{10}$:Eu impurity phase.

DETAILED DESCRIPTION OF THE INVENTION

For a better understanding of the present invention, together with other and further objects, advantages and capabilities thereof, reference is made to the following disclosure and appended claims taken in conjunction with the above-described drawing.

The SrB$_6$O$_{10}$:Eu impurity phase has been experimentally determined to be more basic than the SrB$_4$O$_7$:Eu phase. In addition, other boron rich Sr—B—O—Eu phases and Sr(Eu)—O which may also be present in low brightness phosphor lots are also thought to be more basic than SrB$_4$O$_7$:Eu. Thus, an acidic wash with the appropriate pH will preferentially dissolve out impurity phases. Preferably, the pH of the acidic solution is in the range of about 0.8 to about 1.5 when the acid wash is performed at temperatures from about 65° C. to about 70° C. At temperatures less than about 65° C., larger amounts of acid, and thus a lower pH, may be required to satisfactorily complete the process. A higher pH solution is useful when small amounts of the SrB$_6$O$_{10}$:Eu impurity phase are present. A lower pH solution is useful when large amounts of the SrB$_6$O$_{10}$:Eu impurity phase are present. The proper pH for a given impurity level may be determined experimentally. Preferably, the pH of the phosphor slurry is greater than about 4 after the acid washing procedure. A pH of less than about 4 indicates that too much acid was used.

Two samples of SrB$_4$O$_7$:Eu with different levels of the SrB$_6$O$_{10}$:Eu impurity phase (Samples 1 and 2) were acid washed with two different concentrations of HNO$_3$ acid. In particular, two solutions were made; one with 5 ml acid per 1000 ml of solution (5-ml wash) and the other with 20 ml acid per 1000 ml solution (20-ml wash). The acid solutions were first agitated and heated to 70° C., then 200 grams of phosphor were added to each solution while stirring. The slurries were maintained at 70° C. and agitated for 1 hour. After 1 hour, the heat was removed, 500 ml of de-ionized water was added, and the agitation continued for 15 minutes. The samples were then decanted, allowed to settled, and further washed with water. A small amount of fine particles did not settle and were decanted. Samples were then filtered and dried for 8 hrs at 120° C.

The FIGURE shows x-ray diffraction (XRD) patterns obtained from the initial and acid-washed samples. The XRD pattern from a relatively pure SrB$_6$O$_{10}$:Eu sample (contains a small amount of the SrB$_4$O$_7$:Eu phase) is included to indicate the relative peak positions of the impurity phase. The primary phase observed for the phosphor samples is the SrB$_4$O$_7$:Eu phase. However, the initial samples before washing also contain small impurity diffraction peaks. The most easily discernible impurity peaks occur at approximately 8.1, 24.4, 26.1, and 26.6 degrees 2-theta. Impurity peaks at approximately 16.2, 17.7, and 19.5 degrees 2-theta are also observable. A relative measure of the amount of $SrB_6O_{10}$:Eu impurity phase present in the samples can be obtained by calculating the ratio of intensities of the $SrB_6O_{10}$:Eu diffraction peak at approximately 24.4 degrees 2-theta to the $SrB_4O_7$:Eu diffraction peak at approximately 21.8 degrees 2-theta (after background subtraction). This calculated ratio is listed in Table 1 together with the particle size results. Table 2 provides the UV emission results for these samples. UV emission spectra were obtained using 254 nm excitation radiation. The integrated UV emission intensities and relative quantum efficiencies (QE) are give relative to a standard commercial $SrB_4O_7$:Eu phosphor.

With regard to the quantum efficiencies, QE is generally defined as the ratio of the number of emitted quanta to the number of absorbed quanta. Although the absolute QE can be difficult to determine experimentally, a relative QE can be determined, particularly in this case where the phosphor samples have equivalent emission spectra differing only in overall intensity. The emission spectra of the samples are measured and the light output is calculated relative to the commercial standard. Reflectance spectra are then measured for the samples along with an additional reflectance standard, in this case optical grade $Al_2O_3$. Using an approximation that absorption is equal to unity minus the reflectance (Abs=1−R), the absorption at 254 nm is calculated for the various phosphor samples. The QE values are then calculated by dividing the light output of the phosphor by corresponding absorption value. The QE values in Table 2 are reported relative to the standard commercial phosphor.

The ratio of the XRD diffraction peak intensities for impurity $SrB_6O_{10}$:Eu phase to the $SrB_4O_7$:Eu phase roughly correlates with the UV emission intensities of the samples; the more impurity phase that is present, the lower the UV emission intensity. The 50% particle size is slightly to moderately increased due primarily to a reduction in the number of fine particles. The amount of acid required to completely dissolve the impurity phase is larger for Sample 2 which initially has more impurity phase present. However, the UV emission brightness is equivalent after the impurity phase is removed. Sample 2 also exhibited a greater particle size increase when the impurity phase was removed. The results in Tables 1 and 2 demonstrate that acid washing reduces the amount of $SrB_6O_{10}$:Eu impurity phase present in the samples and increases the UV emission intensity without greatly increasing particle size.

While there has been shown and described what are at the present considered the preferred embodiments of the invention, it will be obvious to those skilled in the art that various changes and modifications may be made therein without departing from the scope of the invention as defined by the appended claims.

What is claimed is:

1. A method of removing impurities from a $SrB_4O_7$:Eu phosphor, the method comprising:
   (a) adding a $SrB_4O_7$:Eu phosphor containing a $SrB_6O_{10}$:Eu impurity phase to an acidic solution;
   (b) dissolving the $SrB_6O_{10}$:Eu impurity phase; and
   (c) separating the phosphor from the dissolved impurity.

2. The method of claim 1 wherein the acidic solution has a pH of from about 0.8 to about 1.5.

3. The method of claim 1 wherein the acidic solution contains nitric acid.

4. The method of claim 1 wherein the pH of the acidic solution is greater than about 4 after the impurity phase is dissolved.

5. The method of claim 2 wherein the solution is heated to a temperature from about 65° C. to about 70° C. to dissolve the impurity phase.

6. A method of removing an $SrB_6O_{10}$:Eu impurity phase from a $SrB_4O_7$:Eu phosphor, the method comprising:
   (a) forming a slurry of a nitric acid solution and the $SrB_4O_7$:Eu phosphor containing the $SrB_6O_{10}$:Eu impurity phase;
   (b) dissolving the $SrB_6O_{10}$:Eu impurity phase; and
   (c) separating the phosphor from the dissolved impurity.

7. The method of claim 6 wherein the nitric acid solution has a pH of from about 0.8 to about 1.5 prior to forming the slurry.

8. The method of claim 6 wherein the pH of the solution is greater than about 4 after the impurity phase is dissolved.

TABLE 1

Physical Properties of Acid-Treated and Untreated $SrB_4O_7$:Eu Phosphors

| Example | XRD Ratio (24.4/21.8) degrees 2-theta | 10% size (microns) | 50% size (microns) |
| --- | --- | --- | --- |
| $SrB_6O_{10}$:Eu | 11.22 | — | — |
| Sample 1 (as-made) | 0.17 | 3.30 | 10.94 |
| Sample 1 (5-ml wash) | 0 | 4.87 | 12.62 |
| Sample 1 (20-ml wash) | 0 | 4.81 | 12.15 |
| Sample 2 (as-made) | 0.29 | 2.91 | 11.58 |
| Sample 2 (5-ml wash) | 0.19 | 3.31 | 12.59 |
| Sample 2 (20-ml wash) | 0 | 5.04 | 13.96 |

TABLE 2

Optical Properties of Acid-Treated and Untreated $SrB_4O_7$:Eu Phosphors

| Example | XRD Ratio (24.4/21.8) degrees 2-theta | Integrated Emission Intensity | 1 − R vs. $Al_2O_3$ std | Relative QE |
| --- | --- | --- | --- | --- |
| $SrB_6O_{10}$:Eu | 11.22 | 6% | 0.711 | 7% |
| Sample 1 (as-made) | 0.17 | 88% | 0.807 | 92% |
| Sample 1 (5-ml wash) | 0 | 101% | 0.810 | 105% |
| Sample 1 (20-ml wash) | 0 | 100% | 0.806 | 105% |
| Sample 2 (as-made) | 0.29 | 70% | 0.773 | 77% |
| Sample 2 (5-ml wash) | 0.19 | 82% | 0.826 | 83% |
| Sample 2 (20-ml wash) | 0 | 102% | 0.853 | 101% |

* * * * *